W. C. COLE.
VEHICLE WHEEL.
APPLICATION FILED APR. 25, 1910.
996,835.
Patented July 4, 1911.
3 SHEETS—SHEET 1.
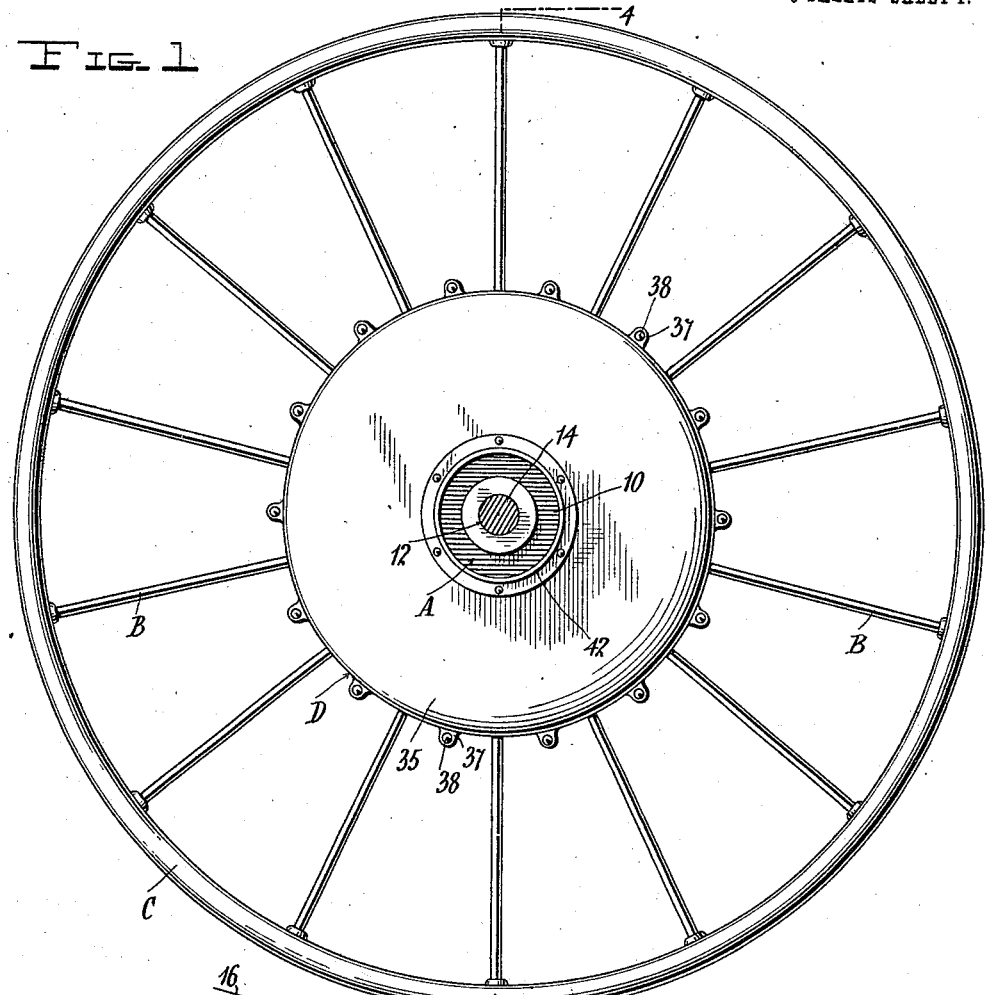
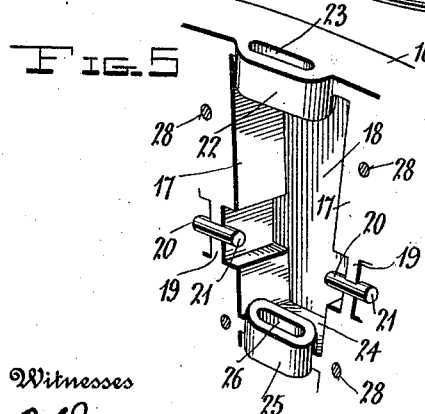
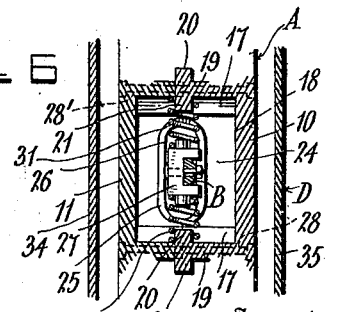
Witnesses
Inventor
William C. Cole
By
Attorneys

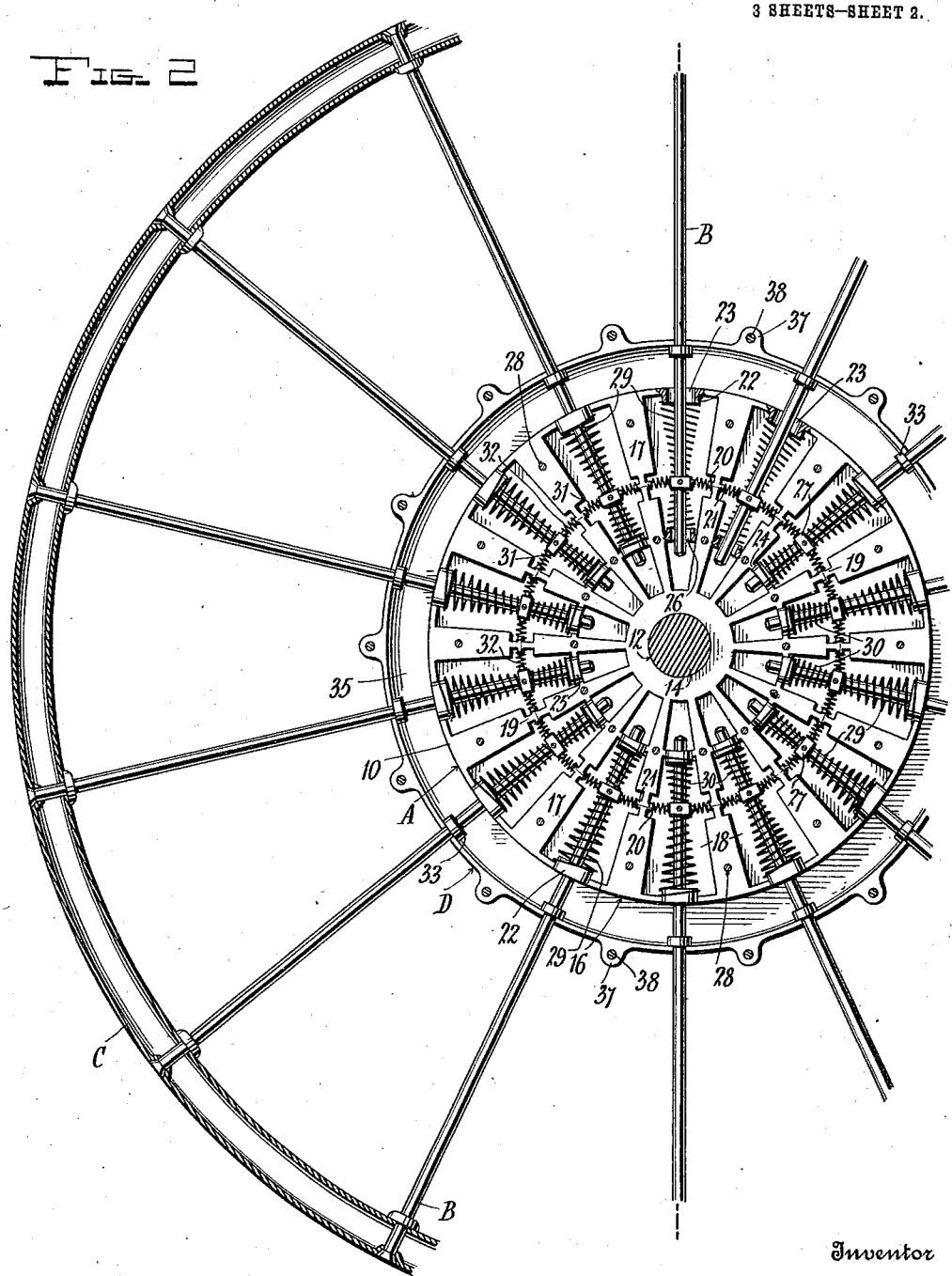

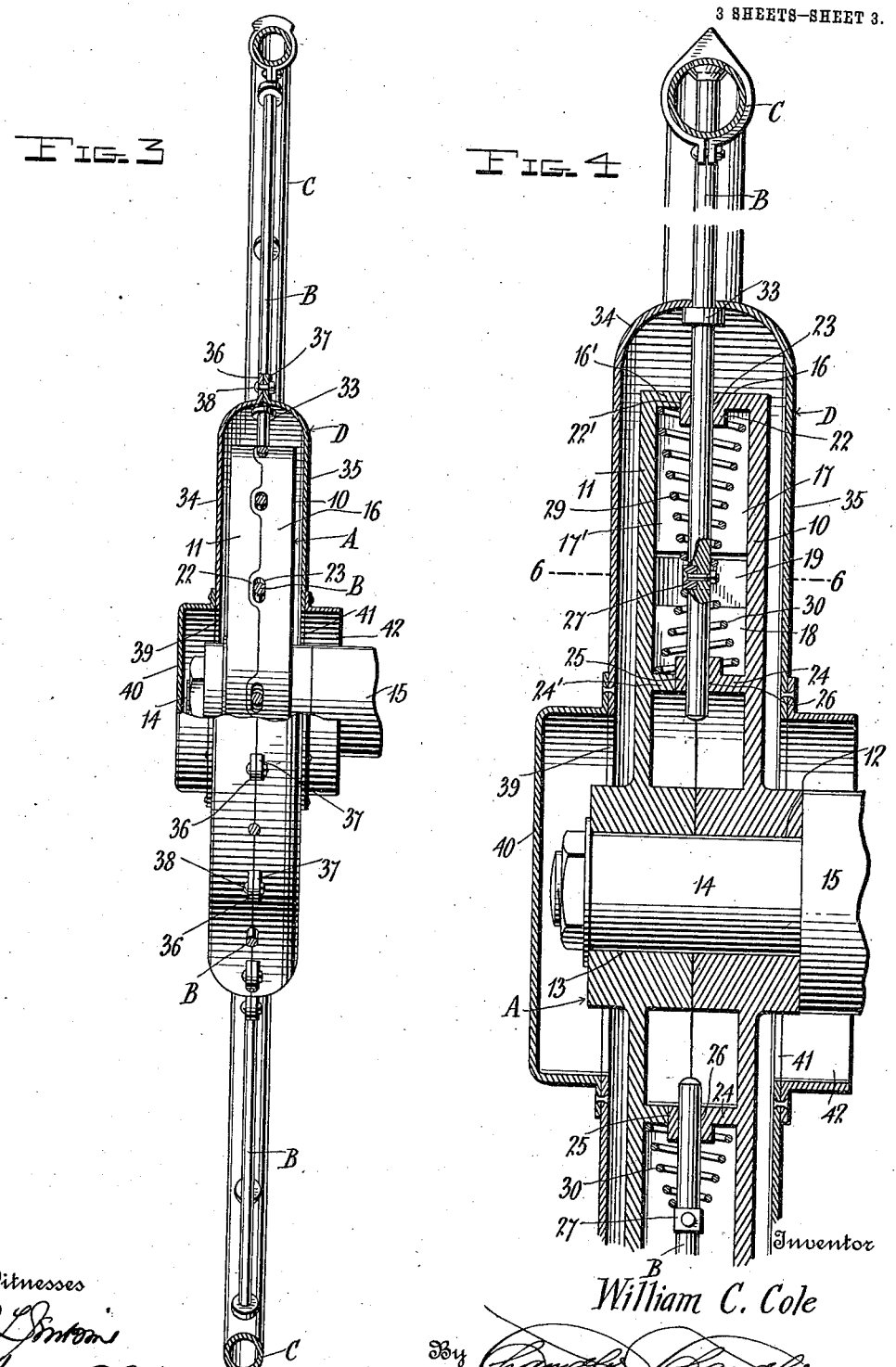

UNITED STATES PATENT OFFICE.

WILLIAM C. COLE, OF LOCUST HILL, MISSOURI.

VEHICLE-WHEEL.

996,835.     Specification of Letters Patent.     Patented July 4, 1911.

Application filed April 25, 1910. Serial No. 557,462.

*To all whom it may concern:*

Be it known that I, WILLIAM C. COLE, a citizen of the United States, residing at Locust Hill, in the county of Knox, State of Missouri, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels and particularly that type which are adapted to absorb shock incident to travel.

The object of the invention resides in so constructing a wheel of the character described that the spokes thereof are adapted for radial and circumferential movement with respect to the hub and are yieldingly supported against said movement.

Another object of the invention resides in providing the wheel with a dust guard supported by the spokes in spaced relation to the hub whereby said guard is capable of movement in unison with the spokes without coming into engagement with the hub.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views; and in which, Figure 1 is a side elevation of a wheel constructed in accordance with the invention; Fig. 2, an enlarged side view of a fragment of the wheel with a section of the hub removed; Fig. 3, an end view of the wheel with the felly and a portion of the spokes broken away, and the dust guard shown partly in section; Fig. 4, an enlarged fragmental section on the line 4—4 of Fig. 1; Fig. 5, a fragmental perspective view of the hub section shown in Fig. 2; and Fig. 6, a section on the line 6—6 of Fig. 4.

Referring to the drawings, the wheel is shown generally as comprising a hub A, spokes B, a felly C and a dust guard D.

The hub A is formed of two circular mating sections 10 and 11 each of which are provided centrally with registering apertures 12 and 13 respectively in which is disposed the spindle 14 of the axle 15 thus effecting a suitable bearing between the assembled hub and said axle. The section 10 of the hub is provided with a circumferential flange 16 which forms a portion of the periphery of the hub; while a series of radially disposed spaced ribs 17 are formed on the inner face of said section for the purpose of producing a plurality of spoke receiving cavities 18. Each of the ribs 17 are provided at corresponding points in their length with reduced portions 19 and projecting from each side of said reduced portion are bosses 20 and 21. Disposed between each of the ribs 17 and extending laterally and inwardly from the flange 16 is a lug 22 provided with a circumferentially disposed slot 23; said slot being of a width substantially equal to the diameter of the spokes B but of a length considerably in excess of said diameter. Connecting each of the ribs 17 near their inner ends is a circumferentially disposed bridge 24 provided with a laterally and upwardly extending lug 25 having a slot 26 therethrough in radial alinement with the slot 23 of the lug 22. Extending through each of the alined slots 23 and 26 is a spoke B adapted as will be apparent to move radially and circumferentially in said slot with respect to the hub. Each of the spokes B has secured thereto between the lugs 22 and 25 and in circumferential alinement with the bosses 20 and 21 of adjacent ribs 17, a cross arm 27.

The hub section 11 is likewise provided with a circumferential flange 16' provided at spaced points on its outer edge with recesses 22' adapted to receive the lug 22 when the hub sections are assembled; the flanges 16 and 16' thus constituting the periphery of the hub A. Formed on the inner side of the hub section 11 are a series of radially disposed ribs 17' adapted to mate with the ribs 17 when the hub sections are secured together; said ribs 17' being connected together by a bridge 24' near their inner end. It will of course be understood that the ribs 17' and the bridges 24' are provided with suitable recesses on their sides adjacent the ribs 17 and the bridges 24 to receive the projecting sides of the bosses 20 and 21 and the lugs 25 respectively. The sections 10 and 11 of the hub are secured together by bolts passed through registering apertures 28 and 28' in the ribs 17 and 17' respectively.

In order to support the spokes B yieldingly against radial and circumferential movements with respect to the hub A a spring 29 encircles each spoke B and has its lower end disposed against the upper side of the cross arm 27 and its upper side against the flanges 16 and 16', while another spring 30 encircles each spoke and has its upper end disposed against the under side of the cross arm 27 and its lower end against the bridges 24 and 24'. From this construction it will be apparent that the spokes B are held yieldingly against radial movement. Disposed between one end of the cross arm 27 and the adjacent face of the ribs 17 with one end surrounding the boss 20 is a spring 31; while another spring 32 is disposed between the other end of the cross arm 27 and the adjacent face of another rib 17; said spring 32 having one end surrounding the boss 21. In order that a proper engagement may be maintained between the ends of the cross arm 27 and the springs 31 and 32 the terminals of said cross arm are reduced and project into the respective springs. It will thus be apparent that the springs 31 and 32 serve to yieldingly support the spokes B against circumferential movement. Each of the spokes B have formed thereon annular projections 33 which serve to limit the inward and outward radial movement of said spokes by engagement with the hub.

The hub A is inclosed by a dust guard D formed of two mating sections 34 and 35 provided with circumferentially disposed ears 36 and 37 through which are passed bolts 38 whereby the sections 34 and 35 of the dust guard are secured together to inclose the hub. The inner face of the periphery of the dust guard D is disposed just outward of the flanges 33 whereby said guard is held against relative movement with respect to the spokes B. The guard D is of sufficient size to be disposed in spaced relation with respect to the hub whereby the radial and circumferential movement of said spokes B can take place without the guard coming in contact with the hub. The section 34 of the guard is provided centrally with an opening 39 which is closed by a projecting cap 40. Likewise the section 35 is provided centrally with an opening 41 around which opening is secured an inwardly projecting sleeve 42.

If desirable the felly C may be provided with detachable calks of the type illustrated in Fig. 3 and adapted particularly for use in travel over soft or muddy roads. In traveling over ice a calk similar to that illustrated in Fig. 4 may be supplied to the felly C.

From the foregoing description it is believed that the construction and operation of the device will be clearly understood but it will be noted that various changes in the details of construction and in the arrangement and combination of parts may be resorted to without in any manner departing from the spirit of the invention as set forth in the scope of the appended claim.

What is claimed is:

A vehicle wheel comprising a hollow hub formed with a plurality of radial cavities and having its periphery provided with a plurality of circumferentially disposed slots each of which open into a respective cavity, a bridge connecting opposite sides of each cavity and provided with a circumferential slot in radial alinement with a circumferential slot in the periphery of the hub, a spoke passing through each slot in the periphery of the hub and the radially alined slot in the bridge disposed within the cavity, a cross arm mounted on each spoke between the periphery of the hub and the bridge within the cavity, a spring surrounding each spoke and having one end in engagement with the upper side of said cross arm and the other end in engagement with the periphery of the hub, a second spring having one end in engagement with the lower side of said cross arm and its other end with the bridge connecting opposite walls of the cavity, and springs disposed between each end of said cross arm and the adjacent wall of the cavity.

In testimony whereof, I affix my signature, in presence of two witnesses.

WILLIAM C. COLE.

Witnesses:
 FRANK MCWILLIAMS,
 J. N. TOWNSEND.

---

Copies of this patent may be obtained for five cents each, by addressing the "Commissioner of Patents, Washington, D. C."